Figure 1:
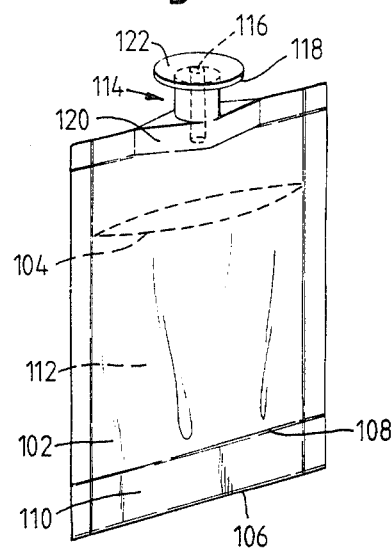

United States Patent [19]

Oakley et al.

[11] Patent Number: 4,738,378

[45] Date of Patent: Apr. 19, 1988

[54] BEVERAGE DISPENSING APPARATUS

[75] Inventors: Peter H. Oakley, Marlow; Barry J. P. Bellinger, Thatcham, both of England

[73] Assignee: Mars Limited, London, England

[21] Appl. No.: 774,388

[22] Filed: Sep. 10, 1985

Related U.S. Application Data

[63] Continuation of Ser. No. 702,426, Feb. 15, 1985, abandoned, which is a continuation of Ser. No. 491,563, May 4, 1983, abandoned.

[30] Foreign Application Priority Data

| May 13, 1982 | [GB] | United Kingdom | 8213998 |
| Jun. 11, 1982 | [GB] | United Kingdom | 8217095 |
| Jul. 2, 1982 | [GB] | United Kingdom | 8219266 |
| Oct. 5, 1982 | [GB] | United Kingdom | 8228449 |
| Oct. 7, 1982 | [GB] | United Kingdom | 8228708 |

[51] Int. Cl.$^4$ .............................................. A47J 31/00
[52] U.S. Cl. .................................... 222/82; 222/83.5; 222/88; 222/165; 222/325; 99/295; 99/300; 426/433
[58] Field of Search ..................... 222/81–82, 222/83.5, 86, 88, 165, 325; 99/295, 292, 300, 304–305, 302 R; 426/115, 433

[56] References Cited

U.S. PATENT DOCUMENTS

| 2,783,704 | 3/1957 | Liebelt | 99/295 |
| 2,883,922 | 4/1959 | Andres | 222/82 X |
| 2,935,929 | 5/1960 | DiCara | 99/295 X |
| 2,939,381 | 6/1960 | McBride | 222/82 X |
| 3,260,190 | 7/1966 | Levinson | 99/295 |
| 3,628,444 | 12/1971 | Mazza | 99/295 X |
| 3,812,273 | 5/1974 | Schmidt | 426/115 X |
| 4,029,003 | 6/1977 | Manaresi | 99/295 |
| 4,164,964 | 8/1979 | Daniels | 99/302 R X |

Primary Examiner—Charles A. Marmor
Attorney, Agent, or Firm—Curtis, Morris & Safford

[57] ABSTRACT

A beverage dispensing apparatus for obtaining a beverage from a normally-sealed beverage dispensing package carrying a locating projection for cooperation with an aqueous medium injector. The package is typically a sachet having, as the locating projection, a nozzle sealed in one edge seam. The sachet is loaded into the open door of the machine with the sachet at least partially-supported on the door by cooperation of its nozzle with a sachet support member. The door is closed and the sachet is transferred to a water-introduction station where a hollow injector and the nozzle are moved into engagement. Water is introduced into the sachet from reservoir, mixes with the contents of the sachet and leaves through an opening made in the base of the sachet to be collected in a container. The spent sachet is then discarded to a waste sachet disposal area.

11 Claims, 5 Drawing Sheets

BEVERAGE DISPENSING APPARATUS

This application is a continuation of application Ser. No. 702,426, filed Feb. 15, 1985, now abandoned, which is a continuation of Ser. No. 491,563, filed May 4, 1983, now abandoned.

This invention relates to beverage dispensing and particularly, but not exclusively, to the production and dispensing of fresh brewed beverages such as coffee and tea.

Over the years, a number of different systems have been proposed for freshly brewing coffee and tea. These generally involve some form of filtration to separate the coffee grounds or tea leaves from the beverage for drinking, and preferably some form of sealed packaging to keep the coffee or tea fresh prior to use.

The idea of sealing fresh coffee or tea in individual packages of an air-impermeable material with a filter material therein is not new. The package is only opened at the time of use, water is introduced therein and the extracted liquid removed, with the coffee grounds or tea leaves retained by the filter material. The package is then discarded.

Several problems exist with dispensing of coffee or tea from such package, especially where they are intended for dispensing from beverage machines.

We have identified at least two major areas of difficulty in handling such sachets efficiently. The first of these can be termed the water introduction area—the mechanism whereby the package is opened and water introduced. In past proposals, it has been intended that the top of the package be cut open, and water fed in under gravity. Not only does this provide unpredictability with filtration time and a variable brew from package to package, but it can be slow (leading to a cold drink). It can also be unhygienic in that, say, coffee grounds can froth out over the top of the package.

A second area of difficulty is in efficiently handling packages in a machine. It is possible to handle packages on a continuous reel-to-reel principle but this can provide hygiene problems, and machine-handling problems increase when separate individual packages are considered. It is also desirable that the packages should not be manually-handled in the water-introducing area as this also can be unhygienic.

These problems are of significance when considered in the environment of a beverage vending machine for public or semi-public (e.g. office) use.

We have now developed beverage dispensing to enable such difficulties to be solved.

According to the invention there is provided a beverage dispensing apparatus for providing a beverage by introducing an aqueous medium into a normally-sealed beverage package, which apparatus comprises means for receiving and supporting the beverage package at a receiving station, means for transferring the package from the receiving station to an aqueous medium introducing station and locating and supporting the package thereat, aqueous medium introducing means at said station for cooperation with a locating means on the package to enable aqueous medium to be introduced therein and a beverage extracted therefrom.

Figure 2:
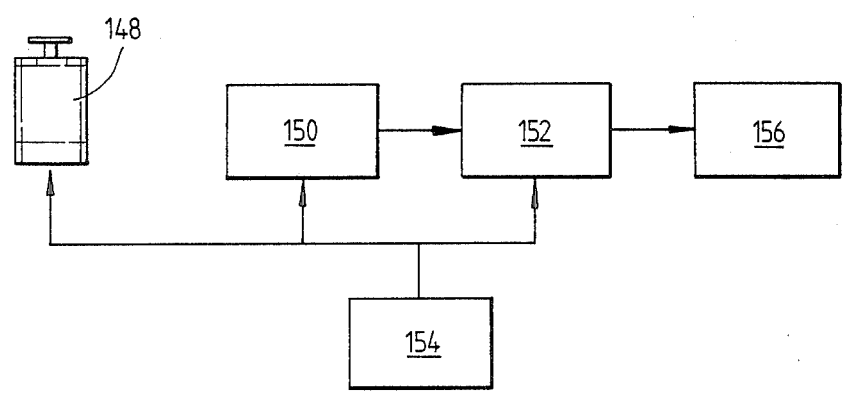
Figure 3:
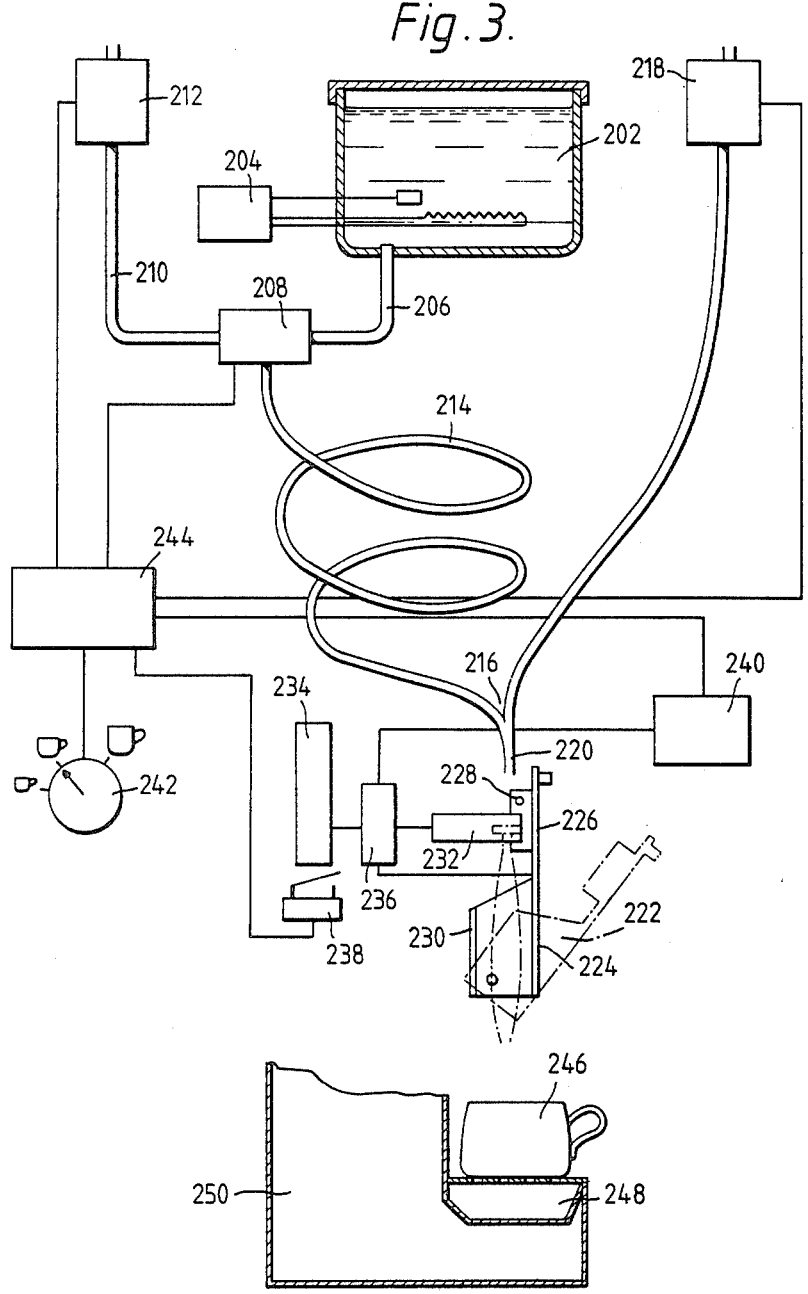
Figure 4:
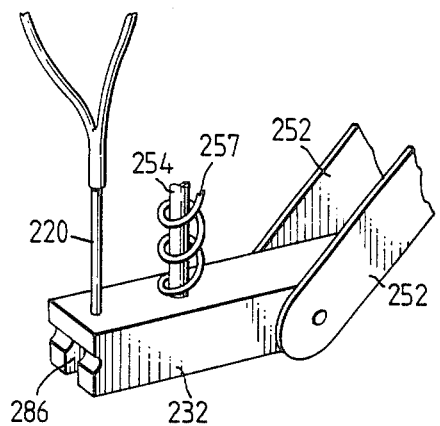
Figure 4:
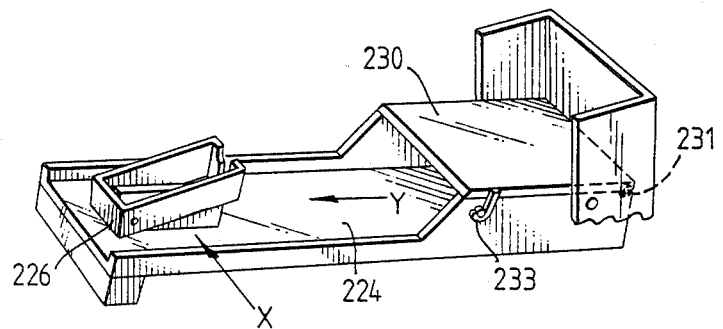
Figure 5:
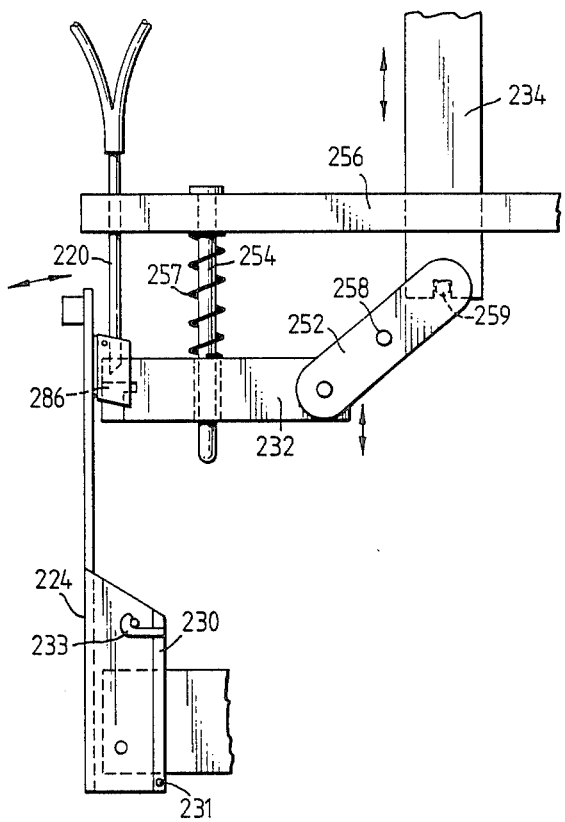
Figure 6:
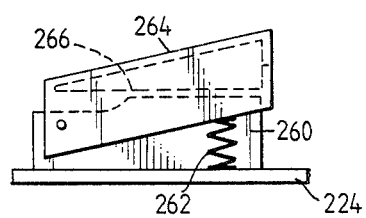
Figure 7:
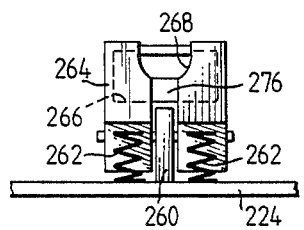
Figure 8:
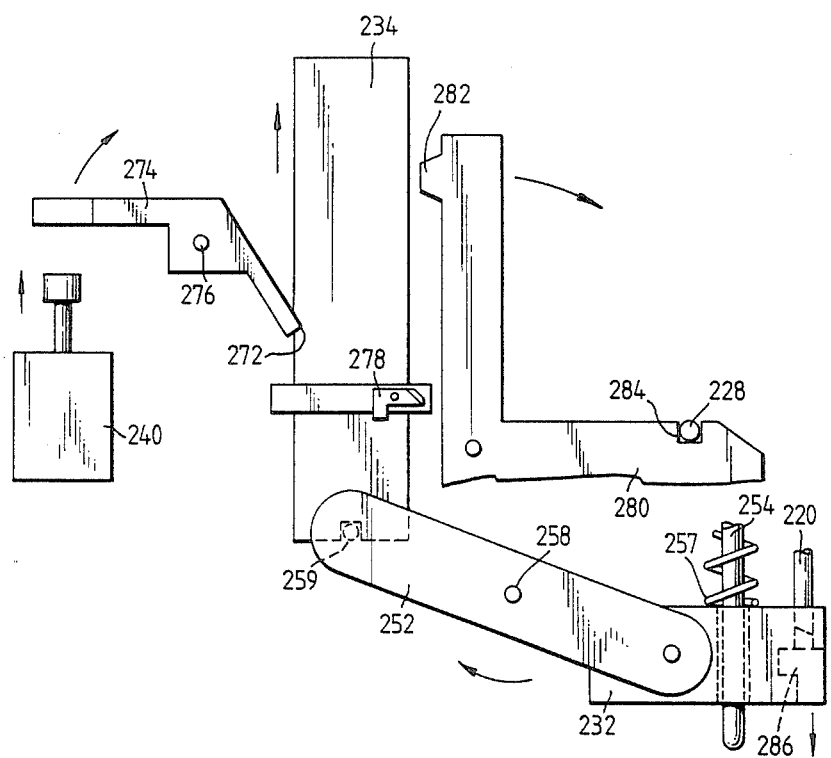

Preferred features of the invention will now be described with reference to the accompanying drawings, given by way of example, in which:

FIG. 1 is a perspective view of a sealed beverage package in the form of a sachet, for use in the preferred apparatus of the invention, FIG. 2 is a schematic representation of the functions of the invention, and FIGS. 3 to 8 are views of a preferred form of beverage dispensing apparatus according to the invention, FIG. 3 being schematic whereas FIGS. 4 to 8 illustrate certain components in more detail;

FIG. 7 is a perspective view of components of the apparatus adjacent its door, whereas FIGS. 5 and 8 are side views of various components. FIGS. 6 and 7 are views along the lines X and Y respectively of FIG. 4. Components not essential to the understanding of the apparatus have been omitted from the drawings.

Referring to FIG. 1, the sealed beverage sachet preferred for use in the apparatus of the invention comprises a substantially air- and water-impermeable sheet material 102 which is a laminate of a layer of metallized polyester and a layer of polypropylene. The metallization is sandwiched between the two plastics layers with the polypropylene layer innermost of the sachet. Enclosed within sheet material 102 is a filter sheet material 104 formed of spun-bonded polypropylene. The materials 102 and 104 have bottom folds 106 and 108, respectively. Fold 106 is lower than fold 108 to provide a chamber 110 below the lowest level of material 104. The side edges of materials 102 and 104 are sealed together to form a pocket which contains ground coffee 112. The top edge of the sachet is also sealed and contains a nozzle 114 having a central water delivery channel 116, a top flange 118 and side fins 120. The water delivery channel 116 is closed with a flashing 122. The top flange 118 enables the sachet to be supported thereby in the beverage dispensing apparatus. When flashing 122 is broken, water may be introduced into the sachet via channel 116. The side fins 120 taper outwardly (when viewed in plan) to each side from the barrel of the nozzle. These fins provide a larger area for efficient sealing of the nozzle to the material 102.

In use, as to be described in detail later, the material 102 is severed in the region of chamber 110 to provide an outlet and the sachet is supported at an aqueous medium introducing station. Aqueous medium, typically hot water, is introduced into the sachet through channel 116 from a hollow water injector which pierces flashing 122 and seals against the side wall of channel 116. The water infuses with the ground coffee, is filtered, and passes out the outlet formed in the severed base of the sachet where it is collected in a suitable container.

FIG. 2 schematically illustrates the stages employed in the apparatus of the invention for obtaining a beverage from a sealed beverage package such as a sachet shown in FIG. 1. Various options are available depending upon the degree of sophistication desired in the apparatus.

Referring to FIG. 2 the sachets 148 for use are either stored separately of the apparatus and introduced therein individually as and when a beverage is desired, or a plurality of such sachets may be stored, e.g. in a magazine, in the machine and extracted automatically when used. Either way, the sachet is passed from a storage or entry station 150 to an aqueous medium introducing station 152. The sachet is opened 154 (i.e. the outlet to enable the beverage to be extracted is formed) either at station 152 or beforehand. The outlet formation may be a manual or mechanical operation. If manual it could involve the removal of a tear strip from the sachet; if mechanical it could involve the use of a guillotine before or at station 152. The aqueous medium is injected into the sachet and the beverage extracted at station 152. The spent sachet is then transferred to a waste sachet disposal station 156. This could involve no more than ejecting the sachet from station 152, or conveying the sachet automatically to a spent sachet storage area.

The apparatus now to be described with reference to FIGS. 3 to 8 is designed to provide beverages from a sachet such as that illustrated in FIG. 1. It is designed particularly, but not exclusively, for the provision of freshly-brewed tea or coffee in an environment where a full degree of automation of beverage dispensing, or where a beverage vending mechanism, is not required. Such an environment is typically an office. For the purposes of this description, the supply of freshly-brewed coffee will be described, although other beverages could equally well be supplied.

Referring to FIGS. 3 to 8, the apparatus comprises a water reservoir 202 containing a heater/thermostat assembly 204 sufficient to maintain the water at about 96° C. A water outlet 206 leads to an electrically-operable three-port valve 208. A second inlet 210 to the latter leads from an air pump 212 such that either air or water is delivered downwardly into delivery tube 214. The latter terminates at one branch of a Y-junction 216, the other upper branch of which leads from an electrically-operable air venting valve 218. The lower branch of junction 216 terminates in an injector 220 having a knife-edged exposed lower opening to facilitate piercing of the covering on a sachet nozzle. (The sachet is shown in dotted form in FIG. 3).

A hinged door 222 is supported such that it normally rests open (shown in dashed lines in FIG. 3) and comprises a front wall 224 carrying a sachet support member 226 and door latching pin 228. A back wall 230 separate from the front wall and hinged to side walls of the door at 231 extends upwardly from the foot of the door and spaced from the front wall 224. There is an open base to the door between the front and back walls and the back wall extends only partially to the height of the front wall. The door 222 is easily removable from its hinges to enable it to be conveniently cleaned. The movement of the back wall 230 about its hinge 231 is restricted by a pair of hook and pin assemblies 233, one each side of the back wall.

A claw support 232 is normally disposed immediately below injector 220 but in use is urged upwardly by depression of an actuator arm 234. The upwardly-urged claw support 232 and depressed actuator arm 234 are latched in this position by a latch mechanism 236. The latter also cooperates with latching pin 228 to lock the door when closed. A microswitch 238 is disposed adjacent actuator arm 234 and is closed thereby when the arm 234 is depressed. The latching mechanism is connected to, and released by operation of, a solenoid 240.

A beverage size selector knob 242 is coupled to an electromechanical cam timer 244 which controls the operation of three-port valve 208, air pump 212, air venting valve 218, and solenoid 240.

A suitable container 246 for receipt of the desired beverage is placed immediately below door 222 and injector 220, supported upon a drip tray 248. Behind drip tray 248 is disposed a waste sachet receipt bin 250.

The valves, pump, heater/thermostat, solenoid, and cam timer components are standard and require no further description. A more detailed explanation of the other components now follows with reference to FIGS. 4 to 8. It will be appreciated in these Figures that the casing and support walls for the various components have been omitted for clarity.

Claw support 232 is pivotably supported by a pair of pivot arms 252 and slidably in relation to a vertical support shaft 254 depending downwardly from fixed casing support surface 256. Pivot arms 252 pivot about a horizontal shaft 258 supported by fixed casing side walls (omitted for clarity). The ends of arms 252 remote from claw support 232 are joined by a bar 259 which sits in a recess at the base of actuator arm 234. A spring 257 biasses the actuator arm 234/claw support 232/pivot arms 252/bar 259 assembly such that the claw support 232 is normally in its down or lowermost position as illustrated in FIG. 5.

Referring to the detail shown in FIGS. 6 and 7, the sachet support member 226 is pivoted to a fixed tongue member 260 which upstands perpendicularly from front wall 224. Springs 262 bias the support member 226 away from the front wall 224. The support member 226 has side walls 264 and base 266, and one side wall 264 possesses a recess 268 of a size to accommodate snugly a sachet nozzle. Support member 226 is slotted at 270 such that, upon depression of member 226 against the bias of springs 262, the member 226 rests flush against front wall 224 and tongue member 260 enters slot 270 and into recess 268.

The latching and release mechanism is illustrated in FIG. 8. The actuator arm 234 possesses a detent 272 into which the tongue of a release trigger 274 enters. The trigger 274 is counter weighted about a pivot 276 such that the tongue normally rests in detent 272 and is only released by upward force provided by solenoid 240. A flange 274 on actuator arm 234 limits motion upwardly and downwardly by abutment against components of the casing support surface 256 (not shown in FIG. 8) and also supports a pivotable cam arm 278. A pivotable latch arm 280 has a cam surface for cooperation with cam arm 278 and a detent 284 for cooperation with door latching pin 228. As shown in FIG. 8, the apparatus is shown with the claw support 232 in its uppermost position, the actuator arm 234 thus being held down by release trigger 274 and the door locked by latch arm 280.

The apparatus operates as follows. The desired size of beverage (small, medium or large size cup) is set at selector knob 242. A sachet as illustrated in FIG. 1 and containing ground coffee is selected from a supply thereof and the bottom edge removed by cutting. The sachet is placed inside the open door 222, in the space between the front and back walls 224, 230, with the sachet nozzle accommodated within the support member 226. The top flange 118 of the nozzle rests within the side walls 264 and against the base 266. The waisted-portion of the nozzle leading to the sachet proper rests within recess 268, and the sachet proper rests against the inside surface of front wall 224. The door is closed and latches thus by cooperation of latching pin 228 in detent 284 of latch arm 280 (FIG. 8). When the door is closed, the support member 226 is pressed against the claw support 232. The action of closing the door compresses the support member 226 against the door front wall 224. The tongue member 260 enters slot 270 and pushes the sachet nozzle onto the claws of claw support 232 at a position immediately below injector 220. To accommodate this function, the claw support 232 comprises a slot 286 complementing the shape of the sachet nozzle and its upper flange.

The operator then depresses actuator arm 234. Claw support 232 thus moves upwardly against the bias of spring 257, causing the knife-edged opening of injector 220 to pierce and enter the sachet nozzle. The arm 234/claw support 232 assembly latches in this position through cooperation of the detent of actuator arm with the tongue of release trigger 274. Depression of actuator arm 234 closes microswitch 238 to actuate cam timer 244 into a programmed sequence of operation of the components it controls.

The programmed sequence is as follows. Initially the air pump 212 is off, the venting valve 218 is closed, the three-port valve 208 in a position to block passage of water from outlet 206 to tubing 214. The solenoid 240 is in an inactive state to maintain the latching mechanism provided via release trigger 274. The air venting valve 218 opens, and the three way valve 208 actuated to admit hot water under gravity into tubing 214. The air venting valve 218 then closes while three-port valve 208 switches over to connect air inlet 210 to tubing 214, thus disconnecting the supply of water. The air pump 212 simultaneously switches on. The pumped air (at approximately 4 psig) forces the water in tubing 214 through injector 220 and into the sachet. The timing of operation of valves 208, 218 and pump 212 is such that the flow rate of water into and through tubing 214 is used as the volumetric gauge to control the supply of the amount of hot water.

With the hot water now in the sachet, the air pump 212 is switched off, thus giving a pause during which time the hot water infuses with the ground coffee material and drips into container 246 only very slowly, if at all. The air pump 212 is then switched on again and the air so pumped forces the hot coffee out of the bottom of the sachet into container 246. The air pump switches off and completes one complete cycle of the programmed sequence.

The sachet is then vented to atmosphere via valve 218, and the solenoid 240 is actuated. This actuates release trigger 274 and releases the tongue of the latter from the detent in actuator arm 234. The actuator arm 234 raises and the claw support 232 lowers under the bias of spring 257. The nozzle of the sachet is pulled off the end of injector 220 by this action. Raising of actuator arm 234 simultaneously raises cam arm 278 which, in cooperation with cam surface 282, causes latch plate 280 to rotate (clockwise in FIG. 8), thus releasing the door latching pin 228 from detent 284. The door 222 drops open. The back wall 230 of the door maintains an upright position until the hook and pin assemblies 233 engage. At this stage the front and back walls 224 and 230 present a pair of slightly-open jaws to the spent sachet therebetween. The door back wall 230 then pivots forward with the rest of the door and catches against the spent sachet which is now just resting by its nozzle in claw support channel 286. The door opening action thus pulls the spent sachet off claw support 232 and the sachet falls downwardly, and obliquely with the opening motion of the door, into the bin 250. The container 246 with its dispensed beverage is removed and the apparatus is ready to provide a further beverage if desired. The provision of a hinged back wall and presentation of a pair of slightly-open jaws to the spent sachet provides more efficient disposal of the sachet into the bin 250.

Although the apparatus so described is not provided with a vending function, such can of course be provided by, for example, coupling a sachet dispensing station with a coin-freed mechanism and/or by coupling the water dispensing apparatus to such mechanism. If desired, the apparatus may be modified in several ways. For example, a cutting mechanism for the base of the sachet may be provided. Various safety circuits may also be incorporated. For example, if a user inserts a unopened sachet, the apparatus initially attempts to force hot water into it. The sachets are of such strength to resist the 4 psig entry force without splitting. However a pressure sensor may be incorporated to detect this and to terminate the dispensing cycle as needs be for safety. The water injector 220 may have a tapered opening to provide more efficient entry, cutting into, and sealing with the sachet nozzle.

If a cutter is provided in the apparatus before the sachet reaches the water introducing station, an interlock may be provided between the cutter and the operating components at the water introducing station. This will ensure that the cutter is employed before a sachet reaches the station and reduce any risk of an unopened sachet reaching the station.

In an alternative embodiment not illustrated, the spent sachet is ejected into the waste sachet disposal station 250 without the hinged door 222 re-opening. In this arrangement the door does not possess a hinged back wall 230 and the spent sachet is ejected from the support provided by the claw support 232 by an ejector mechanism.

We claim:

1. A beverage dispensing apparatus for providing a beverage by introducing an aqueous medium into an initially sealed sachet provided with a projecting locating member and containing a product which provides a beverage when contacted by said aqueous medium comprising:

means for receiving and positively orienting said sachet by said locating member at a receiving station, means for transferring said sachet from said receiving station to an aqueous medium introducing station and for positively locating and supporting said sachet thereat, aqueous medium introducing means movable from a first position remote from said sachet to said sachet to a second position in cooperative engagement with the interior of said sachet, means to dispense a predetermined volume of aqueous medium through said aqueous medium introducing means to produce a beverage after said aqueous medium introducing means has moved from its said first position to its said second position, and a reservoir for aqueous medium and conduit means for passing a predetermined volume of aqueous medium from the reservoir to the aqueous medium introducing means and further comprising air pump means having an outlet connected to a valve in the conduit means, said valve means being operable to close the supply of aqueous medium and to allow air pumped from the air pump to pass through the aqueous medium introducing means to force aqueous medium introduced into said sachet through said sachet and further including an operable vent for venting said conduit means between the valve and said aqueous medium introducing means.

2. An apparatus according to claim 1, wherein said aqueous medium introducing means comprises a hollow needle which in use as it moves from said first position to said second position penetrates a seal provided in said sachet locating member to deliver aqueous medum to the interior of said sachet.

3. An apparatus according to claim 1 including a hinged door member movable from a first open position to a second closed position, said door member including said means thereon for positively receiving and retaining said sachet by its locating member and said means to transfer said sachet to said aqueous medium receiving station when said door member moves from its said first position to its said second position.

4. An apparatus according to claim 3 including lever means to effect said transfer of said sachet from said door member to said aqueous medium receiving station.

5. An apparatus according to claim 1, 2, 3 or 4 including a reservoir for aqueous medium and conduit means for passing a predetermined volume of aqueous medium from the reservoir to the aqueous medium introducing means.

6. An apparatus according to claim to claim 1, 2, 3 or 4 including a reservoir for aqueous medium and conduit means for passing a predetermined volume of aqueous medium from the reservoir to the aqueous medium introducing means and further comprising air pump means having an outlet connected to a valve in the conduit means, said valve means being operable to close the supply of aqueous medium and to allow air pumped from the air pump to pass through the aqueous medium introducing means to force aqueous medium introduced into said sachet through said sachet.

7. A beverage dispensing apparatus for providing a beverage by introducing an aqueous medium into an initially sealed sachet provided with a projecting locating member and containing a product which provides a beverage when contact by said aqueous medium comprising:

means for receiving and positively orienting said sachet by said locating member at a receiving station, means for transferring said sachet from said receiving station to an aqueous medium introducing station and for positively locating and supporting said sachet thereat, aqueous medium introducing means from a first position remote from said sachet to a second position in cooperative engagement with the interior of said sachet, said receiving means comprising a hinged door member movable from a first open position to a second closed position, said door member including means thereon for positively receiving and retaining said sachet by its locating member and means to transfer said sachet to said aqueous medium introducing station when said door member moves for its said first position to its said second position, means to dispense a predetermined volume of aqueous medium through said aqueous medium introducing means into said sachet to produce a beverage, and a reservoir for aqueous medium and conduit means for passing a predetermined volume of aqueous medium from the reservoir to the aqueous medium introducing means and further comprising air pump means having an outlet connected to a valve in the conduit menas, said valve means being operable to close the supply of aqueous medium and to allow air pumped from the air pump to pass through the aqueous medium introducing means to force aqueous medium introduced into said sachet through said sachet and further including an operable vent for venting said conduit means between the valve and said aqueous medium introducing means.

8. An apparatus according to claim 7 wherein said aqueous medium introducing means comprises a hollow needle which in use as it moves from a first position remote from said sachet to a second position wherein it penetrates a seal provided in said sachet locating member to deliver aqueous medium to the interior of said sachet.

9. An apparatus according to claim 7 including lever means to effect a transfer of said sachet from said door member to said aqueous medium receiving station.

10. An apparatus according to claim 7, 8 or 9 including a reservoir for aqueous medium and conduit means for passing a predetermined volume of aqueous medium from the reservoir to the aqueous medium introducing means.

11. An apparatus according to claims 7, 8 or 9 including a reservoir for aqueous medium and conduit means for passing a predetermined volume of aqueous medium for the reservoir to the aqueous medium introducing means and further comprising air pump means having an outlet connected to a value in the conduit means, said valve means being operable to close the supply of aqueous medium and to allow air pumped from the air pump to pass through the aqueous medium introducing means to force aqueous medium introduced into said sachet through said sachet.

* * * * *